(12) United States Patent
Watanabe et al.

(10) Patent No.: US 7,729,815 B2
(45) Date of Patent: Jun. 1, 2010

(54) VEHICLE REMOTE CONTROL APPARATUS AND METHOD

(75) Inventors: Atsushi Watanabe, Anjo (JP); Naoki Taki, Okazaki (JP); Atsushi Niwa, Gifu (JP); Tatsunori Kato, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 255 days.

(21) Appl. No.: 11/795,710

(22) PCT Filed: Jan. 26, 2006

(86) PCT No.: PCT/JP2006/301717

§ 371 (c)(1),
(2), (4) Date: Jul. 20, 2007

(87) PCT Pub. No.: WO2006/090562

PCT Pub. Date: Aug. 31, 2006

(65) Prior Publication Data

US 2008/0103640 A1    May 1, 2008

(30) Foreign Application Priority Data

Feb. 22, 2005    (JP) .............................. 2005-045858

(51) Int. Cl.
G05D 1/00    (2006.01)

(52) U.S. Cl. ...................................... 701/2; 455/456.1

(58) Field of Classification Search .............. 455/456.1; 701/50, 2

See application file for complete search history.

(56) References Cited

U.S. PATENT DOCUMENTS

| | | | | |
|---|---|---|---|---|
| 6,148,212 | A * | 11/2000 | Park et al. ................ | 455/456.1 |
| 7,031,835 | B2 * | 4/2006 | Flick .......................... | 701/213 |
| 2003/0193390 | A1 | 10/2003 | Muramatsu | |
| 2004/0036584 | A1 | 2/2004 | Briick | |
| 2004/0093291 | A1 * | 5/2004 | Bodin ......................... | 705/35 |
| 2004/0236489 | A1 * | 11/2004 | Shibamori et al. ........... | 701/50 |

FOREIGN PATENT DOCUMENTS

| | | |
|---|---|---|
| CN | 1518507 A | 8/2004 |
| DE | 20 2004 005 156 U1 | 7/2004 |
| EP | 1 466 795 A1 | 10/2004 |
| JP | A 2004-102939 | 4/2004 |
| JP | A-2005-14669 | 1/2005 |

* cited by examiner

Primary Examiner—Mark Hellner
(74) Attorney, Agent, or Firm—Oliff & Berridge, PLC

(57) ABSTRACT

A vehicle remote control apparatus (100) for causing a vehicle (101) to perform a requested operation in response to a remote operation request from a vehicle user includes a location identifying unit (204) configured to identify a latest vehicle location where the vehicle is parked, and a decision unit configured to decide whether it is acceptable to cause the vehicle to perform an operation requested from the vehicle user at the latest vehicle location identified by the location identifying unit.

13 Claims, 10 Drawing Sheets

FIG.8

| LEVEL | 3 | 2 | | 1 |
|---|---|---|---|---|
| MEANING | NORMAL | IMPROPER | | DANGEROUS |
| CONDITION | OPEN ROAD | NO-PARKING AREA | NO-STOPPING AREA | HIGHWAY (DRIVING LANE) |
| ACTION | PERMIT | PERMIT CONDITIONALLY | | DO NOT PERMIT |
| CONDITION | NONE (UNCONDITIONAL) | CHECK LATEST VEHICLE POSITION AND TIME | CHECK LATEST VEHICLE POSITION AND TIME + RECONFIRM USER INTENTION | |
| MISCELLANEOUS | RECOMMEND CHECKING LATEST VEHICLE POSITION AND TIME | | | |

VEHICLE REMOTE CONTROL APPARATUS AND METHOD

TECHNICAL FIELD

The present invention generally relates to a vehicle remote control apparatus and method that cause a vehicle to perform a requested operation in response to a remote operation request issued from a vehicle user, and particularly relates to a vehicle remote control apparatus and method that prevent an inappropriate remote control from being performed in view of the current condition of the vehicle.

BACKGROUND ART

Conventionally, an apparatus/system that causes a vehicle to perform a requested operation in response to a remote operation request issued from a vehicle user is known (for example, see Patent Document 1).

The apparatus/system disclosed in Patent Document 1 serves to allow vehicle operations such as the closing of the windows and the turning off of the hazard lamps to be performed via remote control by the user using a portable phone.

[Patent Document] Japanese Patent Application Publication No. 2004-102939

In the conventional apparatus/system disclosed in Patent Document 1 as described above, however, it is possible that the user may request a remote operation without sufficiently knowing the current condition of the vehicle, which may result in a remote operation being requested that is inappropriate in light of the current condition of the vehicle. Further, since the vehicle performs the requested operation without any check, an inappropriate remote operation, when requested, will be performed without exception.

In the following, specific examples will be described by referring to a case in which hazard lamps are turned off by remote control.

With the conventional apparatus/system as disclosed in Patent Document 1, a user is notified when the hazard lamps are on (flashing) even after the passage of a predetermined time following the turning off of the ignition switch. Having received this notice, the user may turn off the hazard lamps by remote control.

However, the situation under which the hazard lamps are left turned-on (flashing) with the ignition off is not limited to when the user has forgotten to switch them off after parking the vehicle. Such situation also includes 1) when the user kept them on (flashing) with the ignition off in order to alert other vehicles running nearby after the vehicle became incapable to run on the road such as on a driving lane, and 2) when another legitimate user is using the vehicle, and keeps the hazard lamps on (flashing) at the time of temporal parking.

Under the situation in which the hazard lamps are on (flashing) due to the reasons other than the user having forgotten to turn them off, a user who is unaware of such situation at a remote site may turn off the hazard lamps by remote control. If this happens, the case 1) described above results in a failure to alert other vehicles running nearby, and the case 2) described above results in an operation being performed that is not intended by the user who is currently using the vehicle.

In this manner, the conventional apparatus/system as described in Patent Document 1 may create a situation in which the user performs an inappropriate remote operation without being sufficiently aware of the current condition of the vehicle. In particular, hazard lamps are vital equipment (security part) that is directly related to the safety of a vehicle. A decision as to whether to turn off the hazard lamps should thus be made with caution.

Accordingly, there is a need for a vehicle remote control apparatus and method that can prevent an inappropriate remote operation from being performed in light of the current condition of the vehicle.

DISCLOSURE OF INVENTION

It is a general object of the present invention to provide a vehicle remote control apparatus and method that substantially obviate one or more problems caused by the limitations and disadvantages of the related art.

It is another and more specific object of the present invention to provide a vehicle remote control apparatus and method that can prevent an inappropriate remote operation from being performed in light of the current condition of the vehicle.

In order to achieve the above objects, according to at least one embodiment of the present invention, a vehicle remote control apparatus (or center) for causing a vehicle to perform a requested operation in response to a remote operation request from a vehicle user includes a location identifying unit configured to identify a latest vehicle location where the vehicle is parked, and a decision unit configured to decide whether it is acceptable to cause the vehicle to perform an operation requested from the vehicle user at the latest vehicle location identified by the location identifying unit.

The vehicle remote control apparatus as described above may further include a denying unit configured to deny a remote operation request from the vehicle user if the decision unit decides that it is not acceptable to cause the vehicle to perform the operation requested from the vehicle user.

In the vehicle remote control apparatus as described above, the location identifying unit includes an acquisition unit configured to acquire data indicative of latitude and longitude of the vehicle (which may be obtained by a GPS receiver implemented on the vehicle) from the vehicle when the vehicle is parked (with the ignition off), a map information storing unit configured to store data of a road map, and a road-type identifying unit configured to check the data indicative of latitude and longitude of the vehicle with the data of a road map stored in the map information storing unit so as to identify a road type (a highway, an open road, a no-parking area, a no-stopping area, etc.) at the latest vehicle location, wherein the decision unit is configured to decide whether it is acceptable to cause the vehicle to perform the operation requested from the vehicle user based on the road type identified by the road-type identifying unit.

With the provision as described above, the propriety of the remote operation is determined based on the latest vehicle location where the vehicle is parked, thereby making it possible to prevent a remote operation inappropriate in light of the current condition of the vehicle from being performed.

According to another embodiment of the present invention, a vehicle remote control apparatus (or center) for causing a vehicle to perform a requested operation in response to a remote operation request from a vehicle user includes a location identifying unit configured to identify a latest vehicle location where the vehicle is parked, and a check unit configured to present the latest vehicle location identified by the location identifying unit to the vehicle user, and to check with the vehicle user whether it is acceptable to cause the vehicle to perform an operation requested from the vehicle user at the latest vehicle location.

The vehicle remote control apparatus as described above may further include a denying unit configured to deny a remote operation request from the vehicle user if the check unit finds that the vehicle user has determined that it is not acceptable to cause the vehicle to perform the operation requested from the vehicle user.

With the provision as described above, the propriety of the remote operation is determined by the vehicle user based on the latest vehicle location where the vehicle is parked, thereby making it possible to prevent a remote operation inappropriate in light of the current condition of the vehicle from being performed.

In view of the fact that it is preferable to refrain from performing a remote operation for the sake of safety in the case of another legitimate user using the vehicle, the vehicle remote control apparatus as described above may further include a time identifying unit configured to identify a time at which the vehicle was parked, wherein the check unit is configured to present the time identified by the time identifying unit together with the latest vehicle location to the vehicle user, and to check with the vehicle user whether the latest vehicle location and the time are consistent with what the vehicle user remembers, and wherein the denying unit is configured to deny a remote operation request from the vehicle user if the check unit finds that the vehicle user has determined that the latest vehicle location and the time are not consistent with what the vehicle user remembers (namely, another vehicle user has been using the vehicle since the original vehicle user parked the vehicle).

The vehicle remote control apparatus as described above may further include a decision unit configured to decide whether it is acceptable to cause the vehicle to perform the operation requested from the vehicle user at the latest vehicle location identified by the location identifying unit, wherein the denying unit is configured to deny a remote operation request from the vehicle user if the decision unit decides that it is not acceptable to cause the vehicle to perform the operation requested from the vehicle user (regardless of the results of the check performed by the check unit or without having the check unit perform the check).

In the vehicle remote control apparatus as described above, the location identifying unit includes an acquisition unit configured to acquire data indicative of latitude and longitude of the vehicle (which may be obtained by a GPS receiver implemented on the vehicle) and data indicative of a time from the vehicle when the vehicle is parked (with the ignition off), a map information storing unit configured to store data of a road map, and a road-type identifying unit configured to check the data indicative of latitude and longitude of the vehicle with the data of a road map stored in the map information storing unit so as to identify a road type (a highway, an open road, a no-parking area, a no-stopping area, etc.) at the latest vehicle location, wherein the check unit is configured to check whether it is acceptable to cause the vehicle to perform the operation requested from the vehicle user based on the road type identified by the road-type identifying unit.

According to another embodiment of the present invention, a vehicle remote control apparatus (or center) for causing a vehicle to perform a requested operation in response to a remote operation request from a vehicle user includes a location identifying unit configured to identify a latest vehicle location where the vehicle is parked, and a determination unit configured to determine a degree of danger resulting from causing the vehicle to perform an operation requested from the vehicle user at the latest vehicle location identified by the location identifying unit, and a denying unit configured to deny a remote operation request from the vehicle user in response to the degree of danger determined by the determination unit.

With this provision, the propriety of the remote operation is determined according to the degree of danger resulting from performing the remote operation, thereby making it possible to prevent a remote operation inappropriate in light of the current condition of the vehicle from being performed.

In the vehicle remote control apparatus as described above, the determination unit is configured to classify the degree of danger into a first rank (dangerous), a second rank (improper), and a third rank (permitted) in a descending order of the degree of danger, and wherein the denying unit is configured to deny a remote operation request from the vehicle user if the determination unit determines the degree of danger to be the first rank, and is further configured to present, if said determination unit determines the degree of danger to be the second rank, the latest vehicle location identified by the location identifying unit to the vehicle user, to check with the vehicle user whether it is acceptable to cause the vehicle to perform an operation requested from the vehicle user at the latest vehicle location, and to deny a remote operation request from the vehicle user only when the vehicle user determines that it is not acceptable to cause the vehicle to perform the requested operation.

According to another aspect of the present invention, a method of remotely controlling a vehicle includes the steps of identifying a latest vehicle location where the vehicle is parked, deciding whether the identified latest vehicle location is proper for a specified operation to be performed, and causing the vehicle to perform the specified operation by remote control in response to a decision that the identified latest vehicle location is proper for the specified operation to be performed.

According to at least one embodiment of the present invention, a vehicle remote control apparatus and method are provided that can prevent a remote operation inappropriate in light of the current condition of the vehicle from being performed.

BRIEF DESCRIPTION OF DRAWINGS

FIG. 8 is a table chart showing an example of Level 1 through Level 3 according to the third embodiment.

BEST MODE FOR CARRYING OUT THE INVENTION

In the following, the best mode for carrying out the present invention will be described by referring to embodiments with reference to accompanying drawings. In the following, an example of a vehicle remote operation will be used in which a user is notified of an operation that the user appears to have forgotten at the time of parking the vehicle, and the notification of a forgotten operation serves as a basis for providing a remote operation to be performed with respect to such forgotten operation (and the cancellation thereof). It should be noted that this is not a limiting example, and any type of operation may be controlled according to the present invention.

Figure 1:
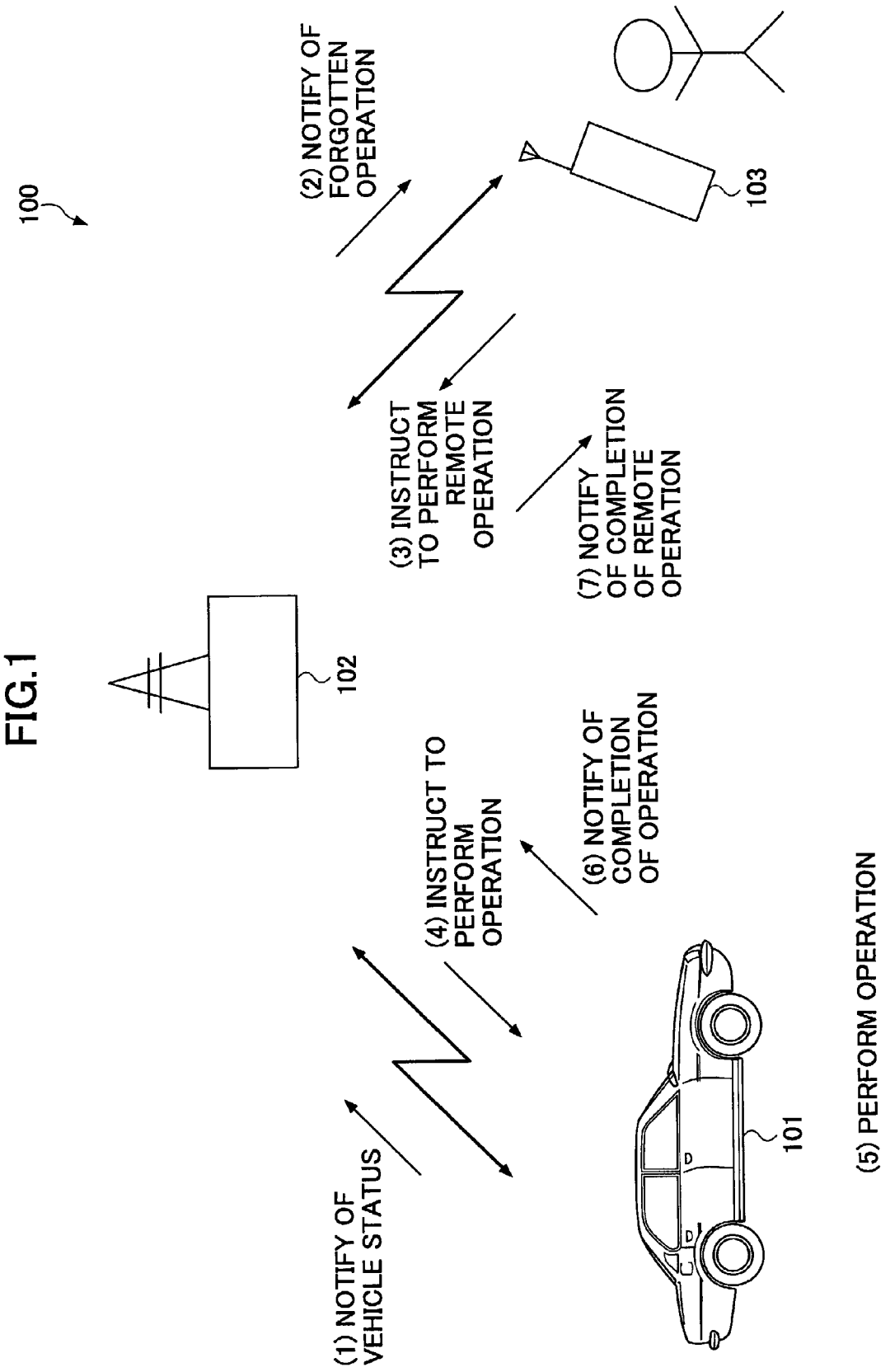
FIG. 1 is a drawing showing the outline of the entirety of a system that is used in each embodiment regarding the remote control of a vehicle.

FIG. 1 is a drawing showing the outline of the entirety of a system that is used in each embodiment regarding the remote control of a vehicle.

A vehicle remote control system 100, which serves as a basis for each embodiment of the present invention, mainly includes a vehicle 101 subjected to remote control, a center (communication station) 102 managed and operated by the vehicle manufacturer, an automobile dealer, or a professional service provider, and a communication terminal 103 owned by the user (owner) of the vehicle.

The user of the vehicle uses the communication terminal 103 to cause the vehicle 101 to perform a predetermined operation via the center 102. As a general rule, this remote control is not allowed unless the ignition switch of the vehicle 101 is off.

The vehicle 101 subjected to remote control notifies the center 102 of the condition of the vehicle if, after the passage of a predetermined time following the turning-off of the ignition switch, the doors are not locked, the hazard lamps are on (flashing), or the power window/sunroof is open.

Having received the notice, the center 102 transmits email to the communication terminal 103 of the user of the vehicle so as to report the condition of the vehicle for which some operation may have been forgotten to be performed.

Having received the notice, the user of the vehicle uses the communication terminal 103 transmits a remote operation instruction (e.g., to lock the doors, to turn off the hazard lamps, or to close the power windows/sunroof) to the center 102. This is performed on a Web page by accessing the Web page provided by the center 102 by use of the communication terminal 103 and by confirming user authenticity.

Upon receiving the remote operation instruction from the user of the vehicle, the center 102 instructs the vehicle 101 to perform the relevant operation. In response to the instruction, the vehicle 101 performs the operation on its own.

Upon completing the operation, the vehicle 101 reports the completion to the center 102. In response to the report of the completion of the operation from the vehicle 101, the center 102 transmits email to the communication terminal 103 of the vehicle user so as to report the completion of the remote operation.

As previously described, the conventional vehicle remote control system based on the notification of a forgotten operation may notify the user even in the case other than when the user has forgotten to perform an operation, resulting in an inappropriate remote operation being performed. The system according to the present invention, on the other hand, prevents an operation inappropriate in light of the current condition of the vehicle 101 from being requested and performed via remote control by the vehicle user.

In the following, three embodiments will be described. In each of these embodiments, a case in which hazard lamps are turned off by remote control will be used as an example of operation.

Embodiment 1

In the following, a vehicle remote control system according to an embodiment (first embodiment) of the present invention will be described with reference to FIG. 2 through FIG. 5.

Figure 2:
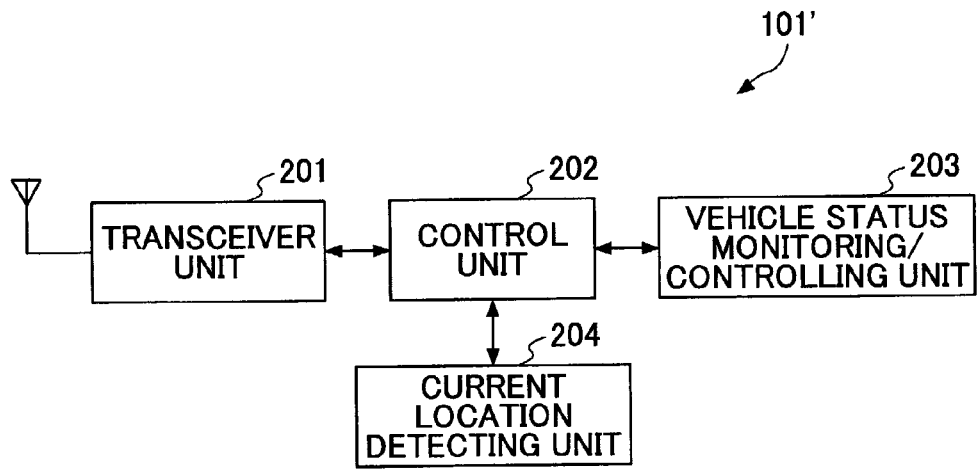
FIG. 2 is a schematic block diagram of an on-vehicle device that is carried on a vehicle subjected to remote control and performs an operation requested by a center.

FIG. 2 is a schematic block diagram of an on-vehicle device 101' that is carried on the vehicle 101 subjected to remote control and performs an operation requested by the center 102.

The on-vehicle device 101' includes a transceiver unit 201 for transmitting/receiving information to/from the center 102 and a control unit 202 for controlling each part of the on-vehicle device 101'.

The on-vehicle device 101' further includes a vehicle status monitoring/controlling unit 203 that monitors the status (flashing/extinguished) of the hazard lamps, and performs an on/off control to switch between the flashing state and the extinguished state.

The on-vehicle device 101' further includes a current location detecting unit 204 that detects the current location of the vehicle 101. In the present embodiment, the current location detecting unit 204 may include a GPS receiver to acquire latitude and longitude information about the vehicle 101. Alternatively, a navigation system, if provided on the vehicle 101, may be used to acquire information regarding the current location of the vehicle.

The control unit 202 transmits the information about the current location of the vehicle 101 detected by the current location detecting unit 204 to the center 102 by use of the transceiver unit 201. Such transmission occurs when the ignition switch of the vehicle 101 is turned off.

When the vehicle status monitoring/controlling unit 203 detects the ON (flashing) of the hazard lamps even after the passage of a predetermined time following the turning off of the ignition switch, the control unit 202 notifies the center 102 of this fact via the transceiver unit 201.

Further, when the transceiver unit 201 receives an operation instruction to turn off the hazard lamps from the center 102, the control unit 202 controls the vehicle status monitoring/controlling unit 203 to turn off the hazard lamps.

Figure 3:
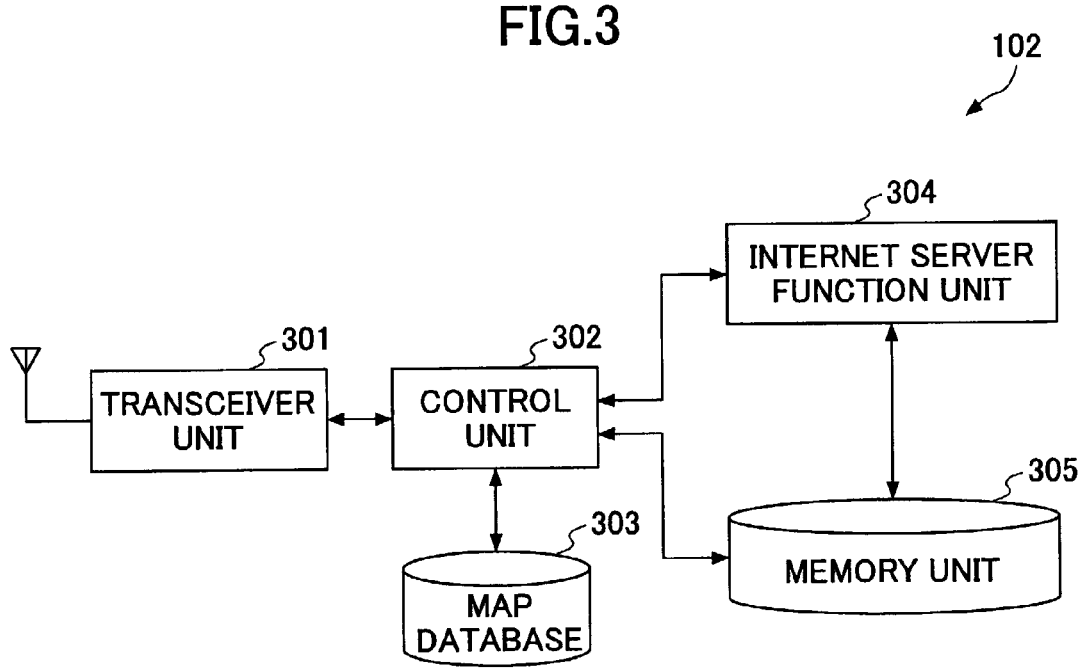
FIG. 3 is a schematic block diagram of the center (vehicle remote control apparatus) that causes the vehicle to perform a requested operation in response to a request from a vehicle user.

FIG. 3 is a schematic block diagram of the center (vehicle remote control apparatus) 102 that causes the vehicle 101 (i.e., the on-vehicle device 101' thereof) to perform a requested operation in response to a request from a vehicle user.

The center 102 includes a transceiver unit 301 for transmitting/receiving information to/from the on-vehicle device 101' and a control unit 302 for controlling each part of the center 102.

The center 102 further includes a map database (DB) 303 that contains map information. If the vehicle 101 is provided with a navigation system, the map database 303 may be shared by such navigation system.

The center 102 further includes an Internet server function unit 304. The Internet server function unit 304 provides a Web page that is accessible by a vehicle user using the communication terminal 103, and is operable to transmit email to the communication terminal 103.

The center 102 includes a memory unit 305 operable to store predetermined data in database format. The memory unit 305 may be any type of memory medium.

The control unit 302 may receive, via the transceiver unit 301, the information about the current location from the on-vehicle device 101' of the vehicle 101 with the ignition off. In response, the control unit 302 acquires information about more precise location by referring to the map database 303, and stores the acquired information in the memory unit 305 in such a manner that the information is associated with the vehicle 101 that is the origin of transmission. Namely, the memory unit 305 stores data indicative of the position where the vehicle 101 was located the last time the ignition switch of the vehicle 101 was turned off.

Further, the control unit 302 may receive, via the transceiver unit 301, information about the condition of the vehicle from the on-vehicle device 101' of the vehicle 101 indicating that the hazard lamps are left turned-on (flashing) even after the passage of a predetermined time following the turning off of the ignition switch. In response, the control unit 302 controls the Internet server function unit 304 to transmit email to the communication terminal 103 (i.e., to its email address) of the vehicle owner so as to report the above-noted fact.

Figure 4:
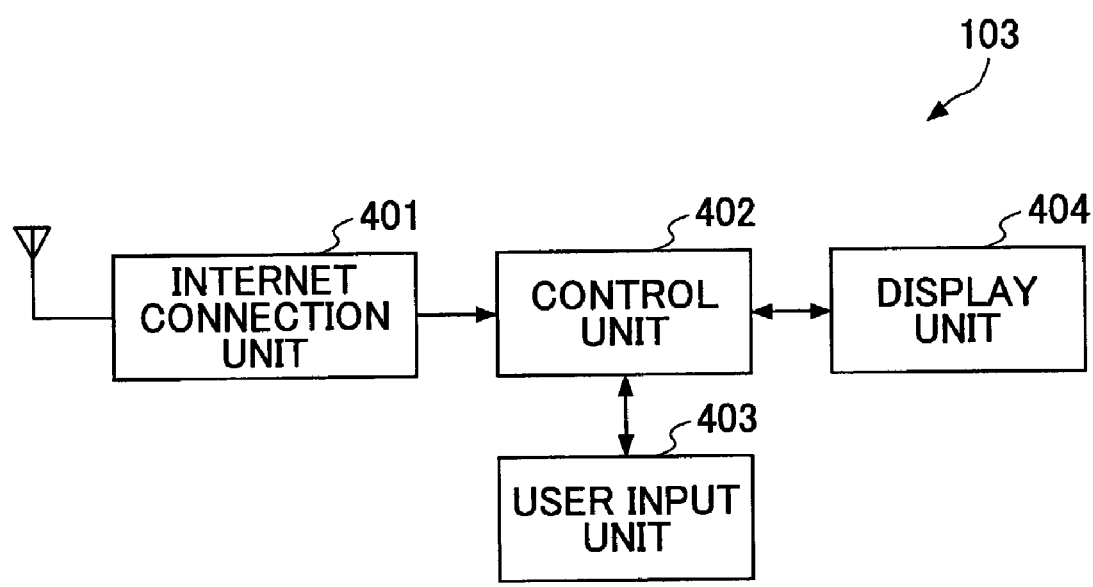
FIG. 4 is a schematic block diagram of the communication terminal 103 used by a vehicle user when performing a remote operation.

FIG. 4 is a schematic block diagram of the communication terminal 103 used by a vehicle user when performing a remote operation. In the present embodiment, the communication terminal 103 may be a portable telephone connectable to the Internet. Alternatively, the communication terminal 103 may be a computer terminal such as a PDA (personal digital assistants) or a notebook PC (personal computer), or may be a fixed terminal such as a desktop PC.

The communication terminal 103 includes an Internet connection unit 401 and a control unit 402. The Internet connection unit 401 serves to receive email from the Internet server function unit 304 of the center 102, and is also used to access the Web page provided by the Internet server function unit 304. The control unit 402 controls each part of the communication terminal 103.

The communication terminal 103 further includes a user input unit 403. The user input unit 403 is used by the vehicle user to enter any character strings into the communication terminal 103, and is also used to select/determine a menu item.

The communication terminal 103 further includes a display unit 404 for visually presenting a received email message or an accessed Web page to the user. In the present embodiment, the display unit 404 may include a small-size LCD (liquid crystal display), for example. Alternatively, the user input unit 403 and the display unit 404 may be combined to form a unitary structure, thereby providing a touch panel.

Figure 5:
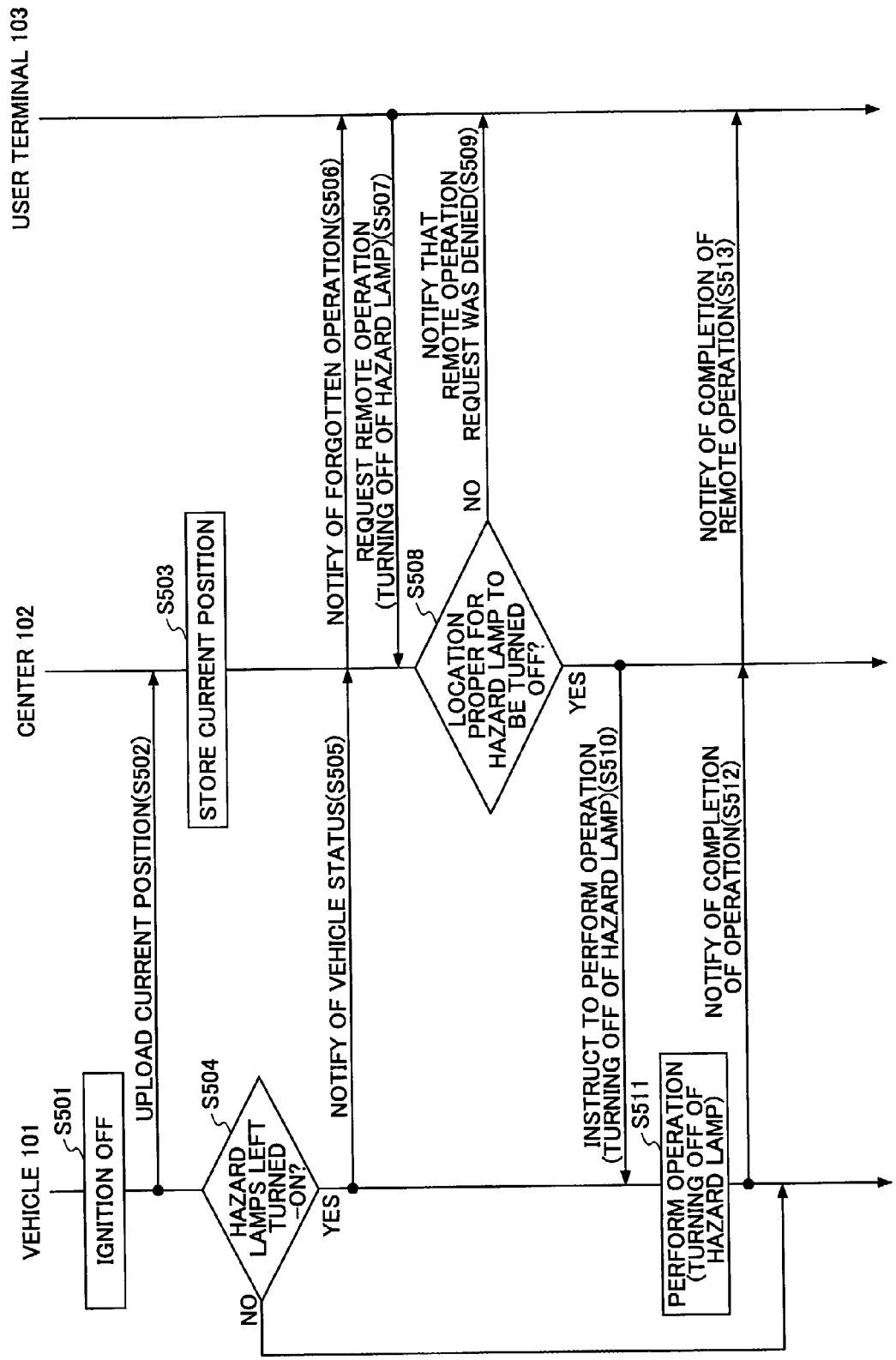
FIG. 5 is a sequence chart showing a remote control process according to the first embodiment.

In the following, a description will be given of the flow of a process of vehicle remote control according to the present embodiment in which the apparatuses have the configurations as described above. FIG. 5 is a sequence chart showing a remote control process according to the present embodiment.

The ignition switch of the vehicle 101 is turned off (S501). In response, the control unit 202 of the on-vehicle device 101' uses the transceiver unit 201 to transmit information about the current location of the vehicle 101 detected by the current location detecting unit 204 to the center 102 (S502).

In the center 102, the transceiver unit 301 receives the information about the current location of the vehicle 101. In response, the control unit 302 acquires information about more precise location by checking the information about the current location with the map database 303, and stores the acquired information in the memory unit 305 in such a manner that the acquired information is associated with the vehicle 101 (S503).

In the vehicle 101, the control unit 202 checks (S504) whether the hazard lamps are on (flashing) based on the results of monitoring by the vehicle status monitoring/controlling unit 203 at the end of a predetermined period following the turning off of the ignition switch (S501). If the hazard lamps are not on (flashing) ("NO" at S504) no particular process is performed.

If the hazard lamps are on (flashing) ("YES" at S504), the control unit 202 uses the transceiver unit 201 to notify the center 102 of this fact (S505). Upon reception of this notice by the transceiver unit 301 of the center 102, the control unit 302 controls the Internet server function unit 304 to create an email message serving as a notification of the forgotten hazard lamps for transmission to the communication terminal 103 of the user of the vehicle 101 (S506).

In the communication terminal 103, the Internet connection unit 401 receives the mail notifying of the forgotten operation. This mail is readable in the same manner as ordinary email messages.

The email notifying of the forgotten operation includes a description of the URL for accessing the Web page provided by the Internet server function unit 304. The user of the vehicle operates the user input unit 403 to select this URL so as to access the Web page.

On this Web page, a list of one or more operations that are remotely performable is presented as selectable menu items after user authentication. In this example, the operation to turn off the hazard lamps is displayed as a performable operation. The user may use the user input unit 403 to select this item, thereby requesting the center 102 to perform a remote operation that turns off the hazard lamps (S507).

When the Internet server function unit 304 learns that the turning off of the hazard lamps is requested by the vehicle user, the control unit 302 of the center 102 reads from the memory unit 305 the latest position where the vehicle was located the last time the ignition switch of the vehicle 101 was turned off. The control unit 302 then determines whether this vehicle location is a place where the hazard lamps may be properly turned off (S508).

For example, if the latest vehicle position is on a driving lane of highway or in an area where parking is prohibited, the place is ascertained as not suitable for the turning off of the hazard lamps because of the reasons as previously described ("NO" at S508).

In such a case, the control unit 302 instructs the Internet server function unit 304 to create an email message indicating that the remote operation is denied by the center 102. This email message may state, "Your vehicle is located at the place where the turning off of the hazard lamps may not be proper, and the requested remote operation to extinguish the hazard lamps is thus denied." The email is transmitted to the communication terminal 103 that is the origin of the remote operation request (S509).

If the latest vehicle position is on an open road (i.e., not on highway) or in a parking area, for example, it is reasonable to assume that the user has simply forgotten to turn off the hazard lamps. The control unit 302 thus determines that it is proper to turn off the hazard lamps ("YES" at S508).

In this case, the control unit 302 uses the transceiver unit 301 to instruct the vehicle 101 to turn off the hazard lamps (S510).

In the vehicle 101, the transceiver unit 201 receives the operation instruction from the center 102. In response, the control unit 202 instructs the vehicle status monitoring/controlling unit 203 to extinguish the hazard lamps (S511). Further, the control unit 202 returns a notice of the completion of the operation to the center 102 via the transceiver unit 201 (S512).

In the center 102, the transceiver unit 301 receives the notice of the completion of the operation from the vehicle 101. In response, the control unit 302 instructs the Internet server function unit 304 to create a completion reporting mail that informs the user of the completion of the remote operation for turning off the hazard lamps. The created mail is transmitted to the communication terminal 103 of the vehicle user (S513).

In this manner, according to the present embodiment, the center 102 that performs remote control has information about the last location where the vehicle 101 subjected to remote control came to a stop. When the user requests to turn off the hazard lamps, the center 102 determines whether this vehicle location is a proper place for the hazard lamps to be turned off. If the vehicle location is determined to be not a proper place, the center 102 denies the request for the remote operation that turns off the hazard lamps. With this provision, it is possible to prevent the performing of a remote control operation for hazard lamp extinguishment that is considered to be inappropriate in light of the current condition of the vehicle.

Further, since the last vehicle location is uploaded to the center from the vehicle at the time of ignition-off, there is no need for the center to check the current position of the vehicle each time the turning off of the hazard lamps is requested from the user.

Embodiment 2

Figure 6:
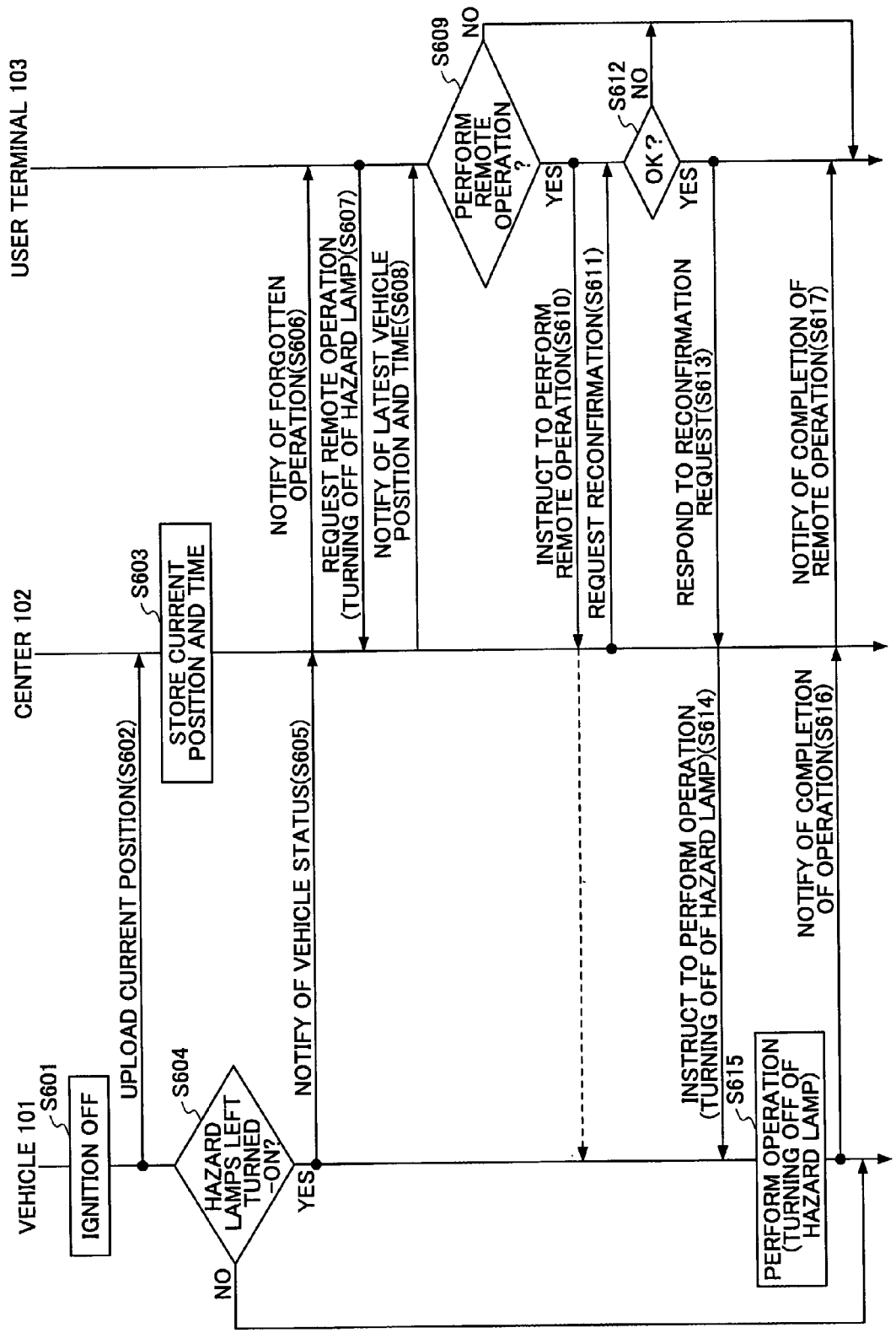
FIG. 6 is a sequence chart showing a remote control process according to the second embodiment.

In the following, a vehicle remote control system according to another embodiment (second embodiment) of the present invention will be described with reference to FIG. 6. The configuration of the system and the configuration of each apparatus of this embodiment are the same as those of the first embodiment, and a detailed description and graphical illustration thereof will be omitted. FIG. 6 is a sequence chart showing a remote control process according to the present embodiment.

In the first embodiment described above, it is the center 102 that determines whether the vehicle location is a proper place for the hazard lamps to be turned off. In the second embodiment, it is the vehicle user who determines whether the vehicle location is a proper place for the hazard lamps to be turned off.

The ignition switch of the vehicle 101 is turned off (S601). In response, the control unit 202 of the on-vehicle device 101' uses the transceiver unit 201 to transmit information about the current location of the vehicle 101 detected by the current location detecting unit 204 to the center 102 (S602).

In the center 102, the transceiver unit 301 receives the information about the current location of the vehicle 101. In response, the control unit 302 acquires information about more precise location by checking the information about the current location with the map database 303, and stores the acquired information in the memory unit 305 in such a manner that the acquired information is associated with the vehicle 101 (S603). At the same time, the control unit 302 utilizes a timestamp function, such that the information about the precise location of the vehicle 101 stored in the memory unit 305 is also associated with (paired with) data indicating when the information about the current location of the vehicle 101 was received by the transceiver unit 301 (S603). Alternatively, the time at which the ignition switch is turned off may be attached to the information about the current location for transmission to the center 102. In the center 102, the time at which the ignition switch is turned off may be stored in memory, such that this time information is associated with (paired with) the information about the precise location.

In the vehicle 101, the control unit 202 checks (S604) whether the hazard lamps are on (flashing) based on the results of monitoring by the vehicle status monitoring/controlling unit 203 at the end of a predetermined period following the turning off of the ignition switch (S601). If the hazard lamps are not on (flashing) ("NO" at S604), no particular process is performed.

If the hazard lamps are on (flashing) ("YES" at S604), the control unit 202 uses the transceiver unit 201 to notify the center 102 of this fact (S605). Upon reception of this notice by the transceiver unit 301 of the center 102, the control unit 302 controls the Internet server function unit 304 to create an email message serving as a notification of the forgotten hazard lamps for transmission to the communication terminal 103 of the user of the vehicle 101 (S606).

In the communication terminal 103, the Internet connection unit 401 receives the mail notifying of the forgotten operation. This mail is readable in the same manner as ordinary email messages.

The email notifying of the forgotten operation includes a description of the URL for accessing the Web page provided by the Internet server function unit 304. The user of the vehicle operates the user input unit 403 to select this URL so as to access the Web page.

On this Web page, a list of one or more operations that are remotely performable is presented as selectable menu items after user authentication. In this example, the operation to turn off the hazard lamps is displayed as a performable operation. The user may use the user input unit 403 to select this item, thereby requesting the center 102 to perform a remote operation that turns off the hazard lamps (S607).

When the Internet server function unit 304 learns that the turning off of the hazard lamps is requested by the vehicle user, the control unit 302 of the center 102 reads from the memory unit 305 the latest position where the vehicle was located the last time the ignition switch of the vehicle 101 was turned off, and also reads from the memory unit 305 the time of the last access to the center 102. The control unit 302 then uses the Internet server function unit 304 to present to the vehicle user the latest vehicle position and time on the Web page (S608).

With this provision, the vehicle user can check whether the latest vehicle position and time are consistent with the position and time of the parking of the vehicle 101 that the user remembers and recognizes. If the latest vehicle position and time are consistent with what the user remembers and recognizes, it can be ascertained that the reason why the hazard lamps are on (flashing) is likely to be because the user has forgotten to turn them off at the time of parking, and that another legitimate user has not used the vehicle 101 since then. Of course, it may be possible that, since the vehicle user left the vehicle 101 with the ignition off, another legitimate user has turned on the hazard lamps of the vehicle 101 without switching on the ignition, and left the vehicle 101. In any case, however, if the vehicle position is consistent with the parking position that the vehicle user remembers and recognizes, the vehicle user can easily make a decision as to whether there is a need to leave the hazard lamps on (flashing) at that vehicle position, or whether the vehicle is located at a place proper for the hazard lamps to be turned off.

If the latest vehicle position and time of the vehicle 101 presented from the center 102 are not consistent with the position of the last parking that the user remembers and recognizes, it can be ascertained that another legitimate user is likely to be using the vehicle 101 at present. In this case, the vehicle user cannot decide whether the current position and condition of the vehicle 101 are proper for the hazard lamps to be turned off. Unless the latest vehicle position is the garage of his/her house or the like, for the sake of safety, the use of the hazard lamps may had better be entrusted to the legitimate user who is currently using the vehicle, and it may not be proper to turn off the hazard lamps by remote control.

Accordingly, the center 102 presents a message together with the latest vehicle position and time on the Web page that the vehicle user is accessing by use of the user terminal 103. The message may state, "If the latest vehicle position and time shown on the screen are different from what you remember, it is possible that another user is using the vehicle. If this is the case, please do not perform remote control for the sake of safety." In this manner, it is preferable to discourage the vehicle user from performing remote control if the vehicle 101 has been moved.

In this manner, the vehicle user checks the latest position and time of the vehicle 101. Based on the check of the latest vehicle position and time, the vehicle user determines whether to turn off the hazard lamps by remote control (S609).

The vehicle user may decide not to turn off the hazard lamps by remote control because the latest vehicle position and time are not what the user remembers or because of some other reason ("NO" at S609). In this case, no particular process is performed.

The user may decide to turn off the hazard lamps by remote control because the latest vehicle position and time are consistent with what the user remembers and recognizes, or may decide to turn off the hazard lamps by remote control despite the fact that the latest vehicle position and time are not consistent with what the user remembers and recognizes ("YES" at S609). In such case, the vehicle user operates the user input unit 403 to instruct the center 102 to perform a remote operation on the Web page provided by the Internet server function unit 304 (S610).

The control unit 302 of the center 102 receives the instruction for remote operation from the user terminal 103 via the Internet server function unit 304. In response, the control unit 302 asks the vehicle user on the Web page provided by the Internet server function unit 304 whether the vehicle user really intends to perform the remote operation (S611). Such reconfirmation of the intention of the vehicle user may be made by presenting a message such as "Hazard lamps will be turned off by remote control. Do you wish to continue?". Together with this message, selectable items "YES" and "NO" may be presented.

If the vehicle user operates the user input unit 403 to select the item indicative of no action in response to the reconfirmation request ("NO" at S612), no particular process is performed as in the case where no action was selected at S609.

If the vehicle user operates the user input unit 403 to reconfirm that he/she wishes to perform the operation in response to the reconfirmation request ("YES" at S612), the vehicle user operates the user input unit 403 to reconfirm the performing of the remote control on the Web page provided by the Internet server function unit 304 (S613).

Upon reconfirming the intention of the vehicle user wishing to perform remote control via the Internet server function unit 304, the control unit 302 of the center 102 utilizes the transceiver unit 301 to instruct the vehicle 101 to turn off the hazard lamps (S614).

It should be noted that the process of reconfirming the intention of the vehicle user at S611 through S613 is not essential to the present embodiment, and an instruction may be sent to the vehicle 101 immediately after the first remote control request (S610) without reconfirmation. Alternatively, the center 102 may decide whether the reconfirmation process is necessary based on the latest vehicle position.

In the vehicle 101, the transceiver unit 201 receives the operation instruction from the center 102. In response, the control unit 202 instructs the vehicle status monitoring/controlling unit 203 to extinguish the hazard lamps (S615). Further, the control unit 202 returns a notice of the completion of the operation to the center 102 via the transceiver unit 201 (S616).

In the center 102, the transceiver unit 301 receives the notice of the completion of the operation from the vehicle 101. In response, the control unit 302 instructs the Internet server function unit 304 to create a completion reporting mail that informs the user of the completion of the remote operation for turning off the hazard lamps. The created mail is transmitted to the communication terminal 103 of the vehicle user (S617).

In this manner, according to the present embodiment, the latest vehicle position and time kept on record at the center 102 are presented to the vehicle user, and the vehicle user is asked to decide whether to turn off the hazard lamps by remote control. This process can thus take into account a decision made by the vehicle user with respect to the remote control operation. Further, the vehicle user is prompted to check the latest vehicle position and time, so that the vehicle user can be discouraged from inappropriately turning off the hazard lamps by remote control.

Further, since the last vehicle location is uploaded to the center from the vehicle at the time of ignition-off, there is no need for the center to check the current position of the vehicle each time the turning off of the hazard lamps is requested from the user.

Embodiment 3

In the following, a vehicle remote control system according to another embodiment (third embodiment) of the present invention will be described with reference to FIG. 7 through FIG. 11. The configuration of the system and the configuration of each apparatus of this embodiment are the same as those of the first and second embodiments, and a detailed description and graphical illustration thereof will be omitted. FIG. 7 through FIG. 11 are partial sequence charts showing a remote control process according to the present embodiment.

In the first embodiment described above, it is the center 102 that determines whether the vehicle location is a proper place for the hazard lamps to be turned off. In the second embodiment, it is the vehicle user who determines whether it is proper to turn off the hazard lamps.

This third embodiment is a proper combination of the first embodiment and the second embodiment. In the third embodiment, the latest vehicle position kept on record by the center 102 is classified into 1) a position for which the turning off of the hazard lamps by remote control is denied, 2) a position for which the turning off of the hazard lamps by remote control is conditionally permitted, and 3) a position for which the turning off of the hazard lamps by remote control is permitted. While using a mechanism that takes into account a decision made by the vehicle user, this embodiment prevents the hazard lamps from being accidentally turned off by remote control at an inappropriate vehicle position.

Figure 7:
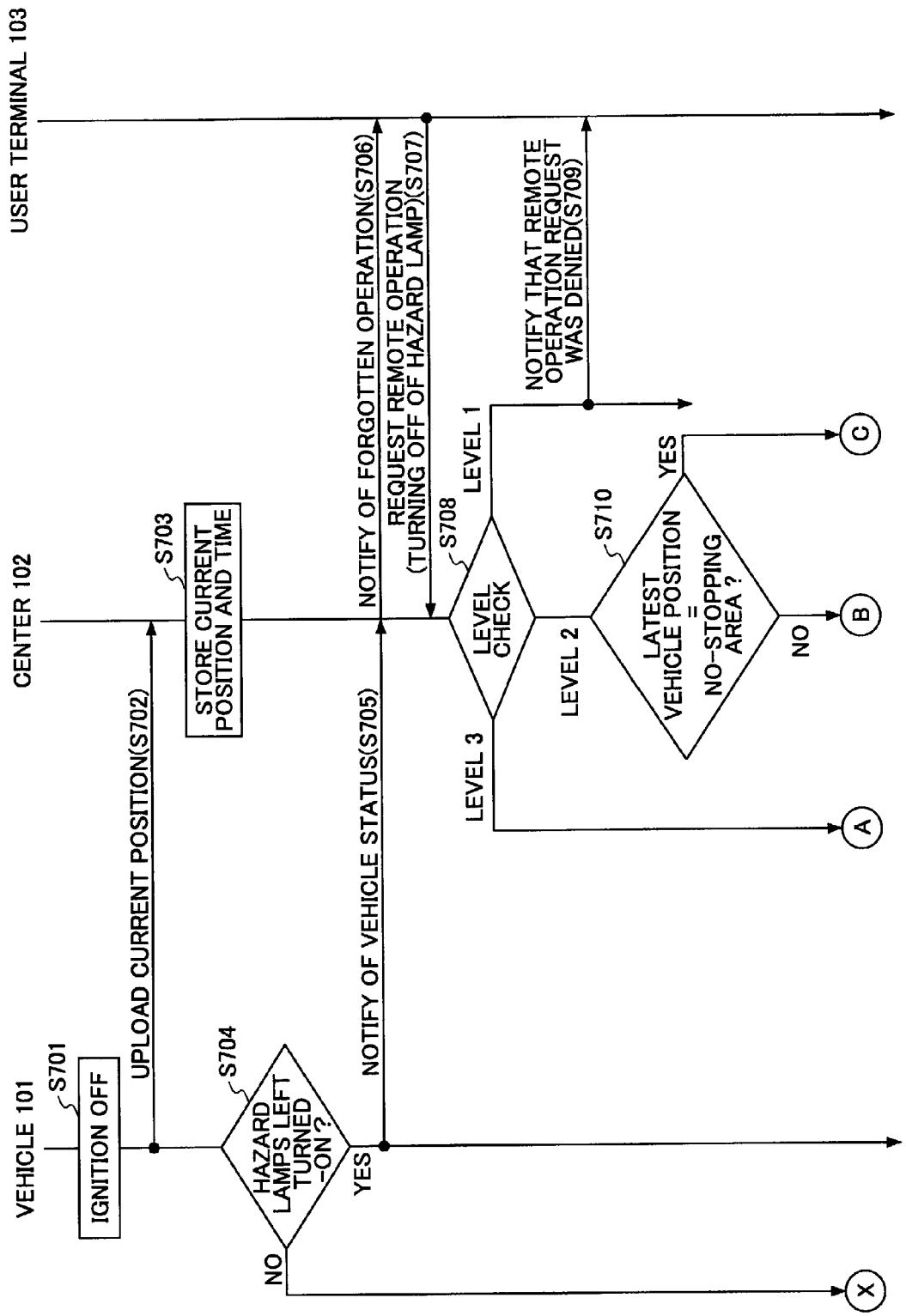
FIG. 7 is a partial sequence chart showing part of a remote control process according to the third embodiment.

FIG. 7 will be described first. The ignition switch of the vehicle 101 is turned off (S701). In response, the control unit 202 of the on-vehicle device 101' uses the transceiver unit 201 to transmit information about the current location of the vehicle 101 detected by the current location detecting unit 204 to the center 102 (S702).

In the center 102, the transceiver unit 301 receives the information about the current location of the vehicle 101. In response, the control unit 302 acquires information about more precise location by checking the information about the current location with the map database 303, and stores the acquired information in the memory unit 305 in such a manner that the acquired information is associated with the vehicle 101 (S703). At the same time, the control unit 302 utilizes a timestamp function, such that the information about the precise location of the vehicle 101 stored in the memory unit 305 is also associated with (paired with) data indicating when the information about the current location of the vehicle 101 was received by the transceiver unit 301 (S703). Alternatively, the time at which the ignition switch is turned off may be attached to the information about the current location for transmission to the center 102. In the center 102, the time at which the ignition switch is turned off may be stored in memory, such that this time information is associated with (paired with) the information about the precise location.

In the vehicle 101, the control unit 202 checks (S704) whether the hazard lamps are on (flashing) based on the results of monitoring by the vehicle status monitoring/controlling unit 203 at the end of a predetermined period following the turning off of the ignition switch (S701). If the hazard lamps are not on (flashing) ("NO" at S704), no particular process is performed.

If the hazard lamps are on (flashing) ("YES" at S704), the control unit 202 uses the transceiver unit 201 to notify the center 102 of this fact (S705). Upon reception of this notice by the transceiver unit 301 of the center 102, the control unit 302 controls the Internet server function unit 304 to create an email message serving as a notification of the forgotten hazard lamps for transmission to the communication terminal 103 of the user of the vehicle 101 (S706).

In the communication terminal 103, the Internet connection unit 401 receives the mail notifying of the forgotten operation. This mail is readable in the same manner as ordinary email messages.

The email notifying of the forgotten operation includes a description of the URL for accessing the Web page provided by the Internet server function unit 304. The user of the vehicle operates the user input unit 403 to select this URL so as to access the Web page.

On this Web page, a list of one or more operations that are remotely performable is presented as selectable menu items after user authentication. In this example, the operation to turn off the hazard lamps is displayed as a performable operation. The user may use the user input unit 403 to select this item, thereby requesting the center 102 to perform a remote operation that turns off the hazard lamps (S707).

When the Internet server function unit 304 learns that the turning off of the hazard lamps is requested by the vehicle user, the control unit 302 of the center 102 checks the level of the latest position of the vehicle 101, and classifies the latest position into one of Level 1 through Level 3 (S708). FIG. 8 is a table chart showing an example of Level 1 through Level 3 according to the present embodiment.

Level 3 (normal level) corresponds to a case in which the latest vehicle position is on an open road or the like. At any vehicle position classed as Level 3, the turning off of the hazard lamps by the vehicle user via remote control is always permitted. There are no conditions that control whether the remote control is permitted. Even when the latest vehicle position is classified as Level 3, however, it is preferable not to perform remote control if the vehicle user does not remember or recognize the latest vehicle position and time. In consideration of this, the center 102 recommends the vehicle user to check the latest vehicle position and time.

Level 2 (improper) corresponds to a case in which the latest vehicle position is determined to be improper for the hazard lamps to be turned off by remote control. According to the degree of improperness, the vehicle position is classified into the no-parking area or the like and the no-stopping area or the like. At a vehicle position classified as Level 2, the turning off of the hazard lamps by the vehicle user via remote control is conditionally permitted. The conditions for the turning off of the hazard lamps require that the vehicle user checks the latest vehicle position and time and approves the remote turning-off if the vehicle position is in a no-parking area. The conditions for the turning off of the hazard lamps require that the vehicle user checks the latest vehicle position and time to approve the remote turning-off and further reconfirms his/her decision if the vehicle position is in a no-stopping area.

Level 1 (danger) corresponds to a case in which the latest vehicle position is on a driving lane of highway or the like. This level is allocated to the places that are not proper for the hazard lamps to be turned off under any circumstances.

Turning back to FIG. 7, the control unit 302 checks the level of the latest position of the vehicle 101 (S708). If it is found that the latest position of the vehicle 101 is classified as Level 1 ("Level 1" at S708), the control unit 302 instructs the Internet server function unit 304 to create an email message indicating that the remote operation is denied by the center 102. This email message may state, "Your vehicle is located at the place where the turning off of the hazard lamps may not be proper, and the requested remote operation to extinguish the hazard lamps is thus denied." The email is transmitted to the communication terminal 103 that is the origin of the remote operation request (S709).

Figure 9:
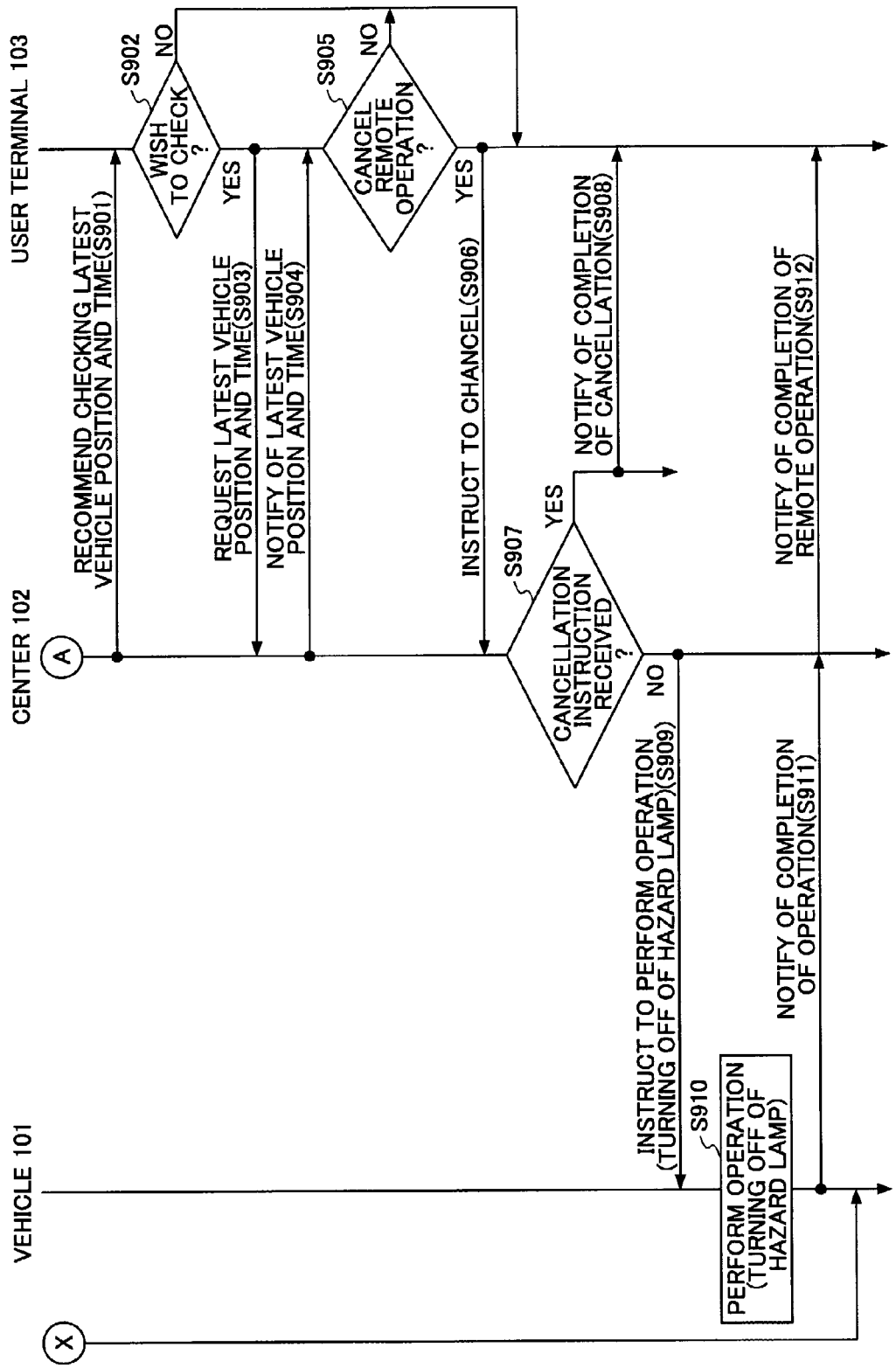
FIG. 9 is a partial sequence chart showing part of the remote control process according to the third embodiment.

If the latest position of the vehicle 101 is classified as Level 3 ("Level 3" at S708), the procedure continues to the chart of FIG. 9.

If the latest position of the vehicle 101 is classified as Level 2 ("Level 2" at S708), a further check is made as to whether the latest position of the vehicle 101 is in a no-stopping area (S710). If the latest vehicle position is in a no-parking area ("NO" at S710), the procedure goes to FIG. 10. If the latest vehicle position is in a no-stopping area ("YES" at S710), the procedure goes to FIG. 11.

FIG. 9 shows a continuation of the flow of the process corresponding to the case in which the latest position of the vehicle 101 is classified as Level 3. As was described with reference to FIG. 8, even when the latest vehicle position is classified as Level 3, it is preferable that the vehicle user checks the latest vehicle position and time to know whether another legitimate user is using the vehicle.

In the case in which Level 3 is selected, the control unit 302 of the center 102 instructs the Internet server function unit 304 to create a recommendation message such as "Checking the latest vehicle position and time is recommended so as to know whether another legitimate user is using the vehicle. Do you wish to check the latest vehicle position and time?". This recommendation message and selectable items "YES" and "NO" are presented on the Web page being accessed by the vehicle user (S901).

If the vehicle user decides and chooses not to check the latest vehicle position ("NO" at S902), a process for checking the latest vehicle position is not performed, and the procedure proceeds to S907.

If the vehicle user decides and chooses to check the latest vehicle position ("YES" at S902), the user terminal 103 requests the center 102 to provide the latest vehicle position and time (S903).

Upon receiving the request for the latest vehicle position and time via the Internet server function unit 304, the control unit 302 of the center 102 reads from the memory unit 305 the latest position where the vehicle was located the last time the ignition switch was turned off, and also reads from the memory unit 305 the time of the last access to the center 102. The control unit 302 then uses the Internet server function unit 304 to present to the vehicle user the latest vehicle position and time on the Web page (S904). At the same time, selectable items such as "cancel" and "continue" are also displayed.

With this provision, the vehicle user can check whether the latest vehicle position and time are consistent with the position and time of the parking of the vehicle 101 that the user remembers and recognizes. In this case, in the same manner as was previously described, the center 102 may preferably present a message together with the latest vehicle position and time on the Web page that the vehicle user is accessing by use of the user terminal 103. The message may state, "If the latest vehicle position and time shown on the screen are different from what you remember, it is possible that another user is using the vehicle. If this is the case, please cancel remote control for the sake of safety." In this manner, it is preferable to discourage the vehicle user from performing remote control if the vehicle 101 has been moved.

If the vehicle user decides and chooses to continue the request for the turning off of the hazard lamps by remote control after checking the latest vehicle position and time ("NO" at S905), the procedure proceeds to S907.

If the vehicle user decides and chooses to cancel the request for the turning off of the hazard lamps by remote control after checking the latest vehicle position and time ("YES" at S905), an instruction to cancel the remote control request is transmitted to the center 102 (S906).

In the center 102, the control unit 302 checks whether an instruction to cancel the request for hazard lamp extinguishment by remote control is received from the user terminal 103 via the Internet server function unit 304 (S907). If the cancellation instruction is received ("YES" at S907), the center 102 does not instruct the vehicle 101 to turn off the hazard lamps, and the remote control request issued at S707 in FIG. 7 is cancelled.

Upon completion of the cancellation process, the control unit 302 of the center 102 instructs the Internet server function unit 304 to create a completion reporting mail that informs the user of the completion of the cancellation process that cancels the turning off of the hazard lamps by remote control. The created mail is transmitted to the communication terminal 103 of the vehicle user (S908). With this arrangement, the vehicle user can confirm that the turning off of the hazard lamps by remote control was cancelled.

If a cancellation instruction is not received ("NO" at S907), the control unit 302 of the center 102 uses the transceiver unit 301 to instruct the vehicle 101 to turn off the hazard lamps (S909).

In the vehicle 101, the transceiver unit 201 receives the operation instruction from the center 102. In response, the control unit 202 instructs the vehicle status monitoring/controlling unit 203 to extinguish the hazard lamps (S910). Further, the control unit 202 returns a notice of the completion of the operation to the center 102 via the transceiver unit 201 (S911).

In the center 102, the transceiver unit 301 receives the notice of the completion of the operation from the vehicle 101. In response, the control unit 302 instructs the Internet server function unit 304 to create a completion reporting mail that informs the user of the completion of the remote operation for turning off the hazard lamps. The created mail is transmitted to the communication terminal 103 of the vehicle user (S912).

In this manner, when the latest vehicle position is determined to be Level 3, the turning off of the hazard lamps is performed as requested by the vehicle user as a general rule. Provision is made, however, such that the vehicle user is recommended to check the latest vehicle position and time of the vehicle 101 subjected to remote control. If the vehicle user wishes to cancel the remote control after the check, the vehicle user can cancel the remote control.

Figure 10:
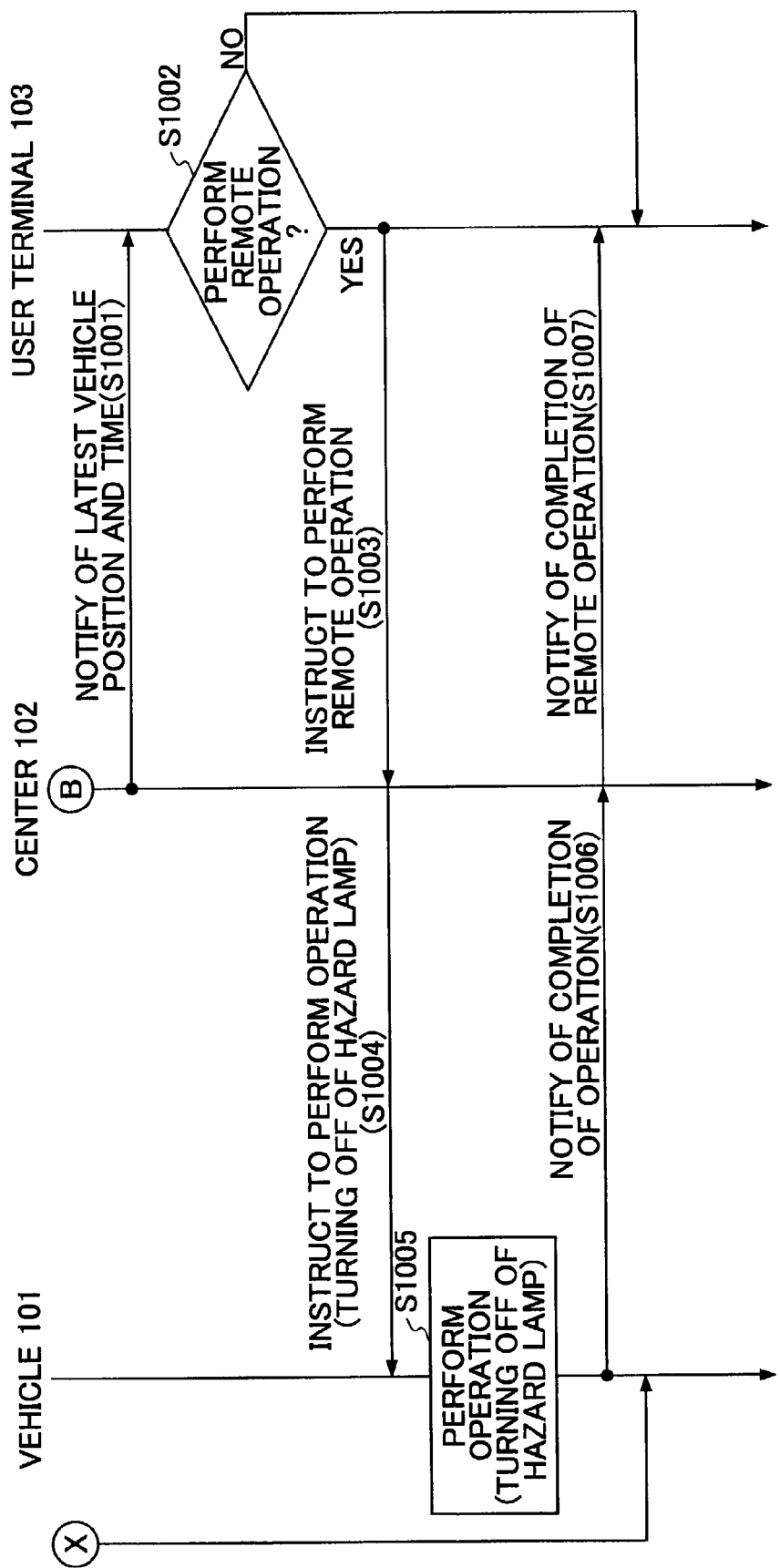
FIG. 10 is a partial sequence chart showing part of the remote control process according to the third embodiment.

FIG. 10 shows a continuation of the flow of the process in the case in which the latest vehicle position is found to be Level 2 at S708 of FIG. 7, and is also found to be in a no-parking area or the like ("NO" at step S710 of FIG. 7). As was described in connection with FIG. 8, the turning off of the hazard lamps by remote control is conditionally permitted with the condition that the vehicle user checks the latest vehicle position and time.

If "NO" is selected at S710 of FIG. 7, the control unit 302 of the center 102 reads from the memory unit 305 the latest position where the vehicle was located the last time the ignition switch of the vehicle 101 was turned off, and also reads from the memory unit 305 the time of the last access to the center 102. The control unit 302 then uses the Internet server function unit 304 to present to the vehicle user the latest vehicle position and time on the Web page (S1001).

With this provision, the vehicle user can check whether the latest vehicle position and time are consistent with the position and time of the parking of the vehicle 101 that the user remembers and recognizes. In this case, the center 102 may preferably present a message together with the latest vehicle position and time on the Web page that the vehicle user is accessing by use of the user terminal 103. The message may state, "If the latest vehicle position and time shown on the screen are different from what you remember, it is possible that another user is using the vehicle. If this is the case, please do not perform remote control for the sake of safety." In this manner, it is preferable to discourage the vehicle user from performing remote control if the vehicle 101 has been moved.

In this manner, the vehicle user checks the latest position and time of the vehicle 101. Based on the check of the latest vehicle position and time, the vehicle user determines whether to turn off the hazard lamps by remote control (S1002).

The vehicle user may decide not to turn off the hazard lamps by remote control because the latest vehicle position and time are not what the user remembers or because of some other reason ("NO" at S1002). In this case, no particular process is performed.

The user may decide to turn off the hazard lamps by remote control because the latest vehicle position and time are consistent with what the user remembers and recognizes, or may decide to turn off the hazard lamps by remote control despite the fact that the latest vehicle position and time are not consistent with what the user remembers and recognizes ("YES" at S1002). In such case, the vehicle user operates the user input unit 403 to instruct the center 102 to perform a remote operation on the Web page provided by the Internet server function unit 304 (S1003).

The control unit 302 of the center 102 receives the instruction for remote operation from the user terminal 103 via the Internet server function unit 304. In response, the control unit 302 uses the transceiver unit 301 to instruct the vehicle 101 to turn off the hazard lamps (S1004).

In the vehicle 101, the transceiver unit 201 receives the operation instruction from the center 102. In response, the control unit 202 instructs the vehicle status monitoring/controlling unit 203 to extinguish the hazard lamps (S1005). Further, the control unit 202 returns a notice of the completion of the operation to the center 102 via the transceiver unit 201 (S1006).

In the center 102, the transceiver unit 301 receives the notice of the completion of the operation from the vehicle 101. In response, the control unit 302 instructs the Internet server function unit 304 to create a completion reporting mail that informs the user of the completion of the remote operation for turning off the hazard lamps. The created mail is transmitted to the communication terminal 103 of the vehicle user (S1007).

In this manner, when the latest vehicle position is determined to be Level 2, and is also found to be in a no-parking area or the like, the turning off of the hazard lamps is discriminatingly permitted with the condition that the vehicle user checks the latest vehicle position and time.

Figure 11:
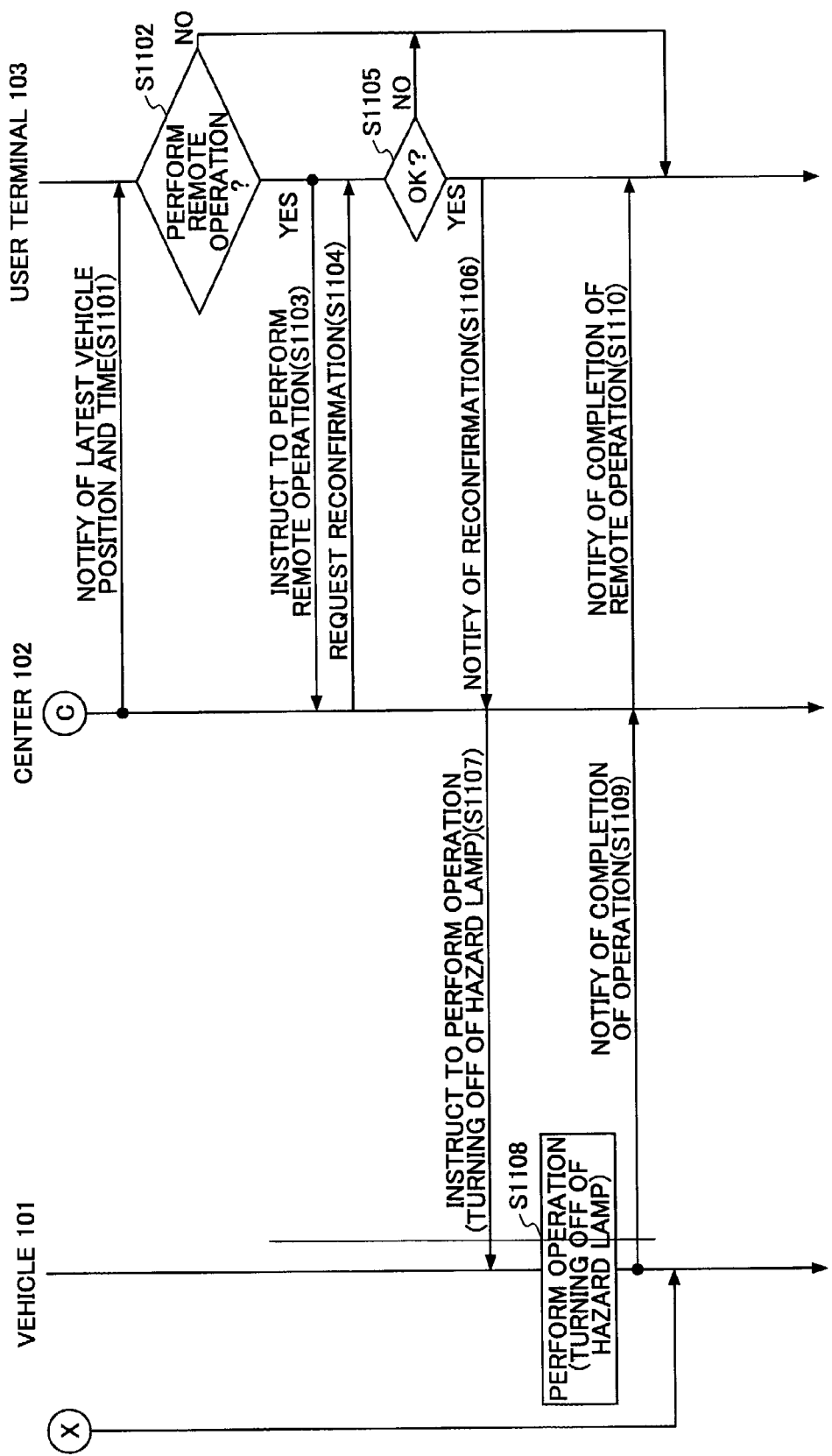
FIG. 11 is a partial sequence chart showing part of the remote control process according to the third embodiment.

FIG. 11 shows a continuation of the flow of the process in the case in which the latest vehicle position is found to be Level 2 at S708 of FIG. 7, and is also found to be in a no-stopping area or the like ("YES" at step S710 of FIG. 7). As was described in connection with FIG. 8, the turning off of the hazard lamps by remote control is discriminatingly permitted with the condition that the vehicle user checks the latest vehicle position and time in a stricter manner.

If "YES" is selected at S710 of FIG. 7, the control unit 302 of the center 102 reads from the memory unit 305 the latest position where the vehicle was located the last time the ignition switch of the vehicle 101 was turned off, and also reads from the memory unit 305 the time of the last access to the center 102. The control unit 302 then uses the Internet server function unit 304 to present to the vehicle user the latest vehicle position and time on the Web page (S1101).

With this provision, the vehicle user can check whether the latest vehicle position and time are consistent with the position and time of the parking of the vehicle 101 that the user remembers and recognizes. In this case, the center 102 may preferably present a message together with the latest vehicle position and time on the Web page that the vehicle user is accessing by use of the user terminal 103. The message may state, "If the latest vehicle position and time shown on the screen are different from what you remember, it is possible that another user is using the vehicle. If this is the case, please do not perform remote control for the sake of safety." In this manner, it is preferable to discourage the vehicle user from performing remote control if the vehicle 101 has been moved.

In this manner, the vehicle user checks the latest position and time of the vehicle 101. Based on the check of the latest vehicle position and time, the vehicle user determines whether to turn off the hazard lamps by remote control (S1102).

The vehicle user may decide not to turn off the hazard lamps by remote control because the latest vehicle position and time are not what the user remembers or because of some other reason ("NO" at S1102). In this case, no particular process is performed.

The user may decide to turn off the hazard lamps by remote control because the latest vehicle position and time are consistent with what the user remembers and recognizes, or may decide to turn off the hazard lamps by remote control despite the fact that the latest vehicle position and time are not consistent with what the user remembers and recognizes ("YES" at S1102). In such case, the vehicle user operates the user input unit 403 to instruct the center 102 to perform a remote operation on the Web page provided by the Internet server function unit 304 (S1103).

The control unit 302 of the center 102 receives the instruction for remote operation from the user terminal 103 via the Internet server function unit 304. In response, the control unit 302 asks the vehicle user on the Web page provided by the Internet server function unit 304 whether the vehicle user really intends to perform the remote operation (S1104). Such reconfirmation of the intention of the vehicle user may be made by presenting a message such as "Hazard lamps will be turned off by remote control. Do you wish to continue?". Together with this message, selectable items "YES" and "NO" may be presented.

If the vehicle user operates the user input unit 403 to select the item indicative of no action in response to the reconfirmation request ("NO" at S1105), no particular process is performed as in the case where no action was selected at S1102.

If the vehicle user operates the user input unit 403 to reconfirm that he/she wishes to perform the operation in response to the reconfirmation request ("YES" at S1105), the vehicle user operates the user input unit 403 to reconfirm the performing of the remote control on the Web page provided by the Internet server function unit 304 (S1106).

Upon reconfirming the intention of the vehicle user wishing to perform remote control via the Internet server function unit 304, the control unit 302 of the center 102 utilizes the transceiver unit 301 to instruct the vehicle 101 to turn off the hazard lamps (S1107).

In the vehicle 101, the transceiver unit 201 receives the operation instruction from the center 102. In response, the control unit 202 instructs the vehicle status monitoring/controlling unit 203 to extinguish the hazard lamps (S1108). Further, the control unit 202 returns a notice of the completion of the operation to the center 102 via the transceiver unit 201 (S1109).

In the center 102, the transceiver unit 301 receives the notice of the completion of the operation from the vehicle 101. In response, the control unit 302 instructs the Internet server function unit 304 to create a completion reporting mail that informs the user of the completion of the remote operation for turning off the hazard lamps. The created mail is transmitted to the communication terminal 103 of the vehicle user (S1110).

In this manner, when the latest vehicle position is determined to be Level 2, and is also found to be in a no-stopping area or the like, the turning off of the hazard lamps is permitted in a more discriminatory manner with the condition that the vehicle user checks the latest vehicle position and time, and also reconfirms his/her intension to turn off the hazard lamps by remote control.

In this manner, according to the present embodiment, the latest vehicle position and time kept on record at the center with respect to the vehicle subjected to remote control are presented to the vehicle user who is requesting remote control, thereby giving an opportunity to decide whether or not to perform remote control based on whether the position and time are consistent with what the vehicle user remembers. If the vehicle is located at the place where the turning off of the hazard lamps should never be permitted, a request for remote control is denied on a mandatory basis without asking for a decision by the vehicle user. In this manner, while a decision by the vehicle user is taken into account as a general rule, the accidental turning off of the hazard lamps by remote control is effectively prevented at an inappropriate vehicle location.

Further, since the last vehicle location is uploaded to the center from the vehicle at the time of ignition-off, there is no need for the center to check the current position of the vehicle each time the turning off of the hazard lamps is requested from the user.

Heretofore, a description has been given of the first through third embodiments of the vehicle remote control apparatus according to the present invention by using an example in which the hazard lamps are turned off by remote control. As is apparent to any skilled person in the field, the vehicle remote control apparatus according to the present invention is applicable to other types of remote control operations (e.g., the locking of the doors, the closing of the power windows, the closing of the sunroof) in addition to the turning off of the hazard lamps.

The first through third embodiments described above have used an example in which the center 102 has the map database 303, and acquires precise location information (a highway, an open road, a no-parking area, a no-stopping area, etc.) by checking the current location information (e.g., longitude/latitude data) received from the vehicle 101 with the map database 303, with the resulting location information being stored in the memory unit 305. The present invention is not limited to this example. If the vehicle 101 has a navigation system, the current location information may be checked with the map data of the navigation system so as to obtain precise location information at the vehicle 101, followed by transmitting the obtained information to the center 102. However, the traffic of radio communication may be congested, and, also, data processing ability is generally higher at the center 102 than at the vehicle 101. Further, it is easier to update the map database to the latest version at the center 102 than at the vehicle 101. Because of these reasons, it may be preferable to obtain precise location information at the center as in the first through third embodiments.

In the second and third embodiments described above, further, the latest vehicle position and time are presented to the vehicle user, followed by requesting a user decision (and reconfirmation in some cases) by asking the vehicle user whether remote control should be performed or canceled (S609 of FIG. 6, S905 of FIG. 9, and S1102 of FIG. 11). This is only a non-limiting example, and the present invention includes an embodiment in which decisions on the center side are increased. For example, the latest vehicle position and time may be presented to the vehicle user, followed by asking the vehicle user a question such as "Is this different from the position and time of the last parking that you remember?". If the vehicle user gives an answer to the effect that the position and time is different (the vehicle has been moved and/or the time is different), the request for remote control is denied without exception.

As is apparent to any skilled person in the art, the three-level classification of the latest vehicle position as is done in the third embodiment is only a non-limiting example, and the number of levels may be any number. In any case, the greater the danger caused by accidentally turning off the hazard lamps, the stricter the conditions for remote control should be as in the third embodiment.

Further, it should be noted that the vehicle subjected to remote control by the vehicle remote control apparatus of the present invention can be any vehicle regardless of its exterior appearance, weight, size, drive performance, etc.

Although the present invention has been described with reference to embodiments, the present invention is not limited to these embodiments, but various variations and modifications may be made without departing from the scope of the invention as set forth in the accompanying claims.

The present application is based on Japanese priority application No. 2005-045858 filed on Feb. 22, 2005, with the Japanese Patent Office, the entire contents of which are hereby incorporated by reference.

The invention claimed is:

1. A vehicle remote control apparatus, for causing a vehicle to perform a requested operation in response to a remote operation request from a vehicle user, comprising:
   a location identifying unit configured to identify a latest vehicle location where the vehicle is parked; and
   a decision unit configured to decide whether it is acceptable to cause the vehicle to perform the remote operation requested from the vehicle user at the latest vehicle location identified by said location identifying unit,
   wherein said location identifying unit includes:
   an acquisition unit configured to acquire data indicative of latitude and longitude of the vehicle from the vehicle when the vehicle is parked;
   a map information storing unit configured to store data of a road map; and
   a road-type identifying unit configured to check the data indicative of latitude and longitude of the vehicle with the data of a road map stored in said map information storing unit so as to identify a road type at the latest vehicle location, and
   wherein said decision unit is configured to decide whether it is acceptable to cause the vehicle to perform the operation requested from the vehicle user based on the road type identified by said road-type identifying unit.

2. A vehicle remote control apparatus for causing a vehicle to perform a requested operation in response to a remote operation request from a vehicle user, comprising:
   a location identifying unit configured to identify a latest vehicle location where the vehicle is parked; and
   a check unit configured to present the latest vehicle location identified by said location identifying unit to a communication terminal owned by the vehicle user, and to receive, as a response to the presented vehicle location, information entered by the vehicle user into the communication terminal about whether it is acceptable to cause the vehicle to perform the operation requested from the vehicle user via the communication terminal by the remote operation request at the latest vehicle location.

3. The vehicle remote control apparatus as claimed in claim 2, further comprising a denying unit configured to deny a remote operation request from the vehicle user if said check unit finds that the vehicle user has determined that it is not acceptable to cause the vehicle to perform the operation requested from the vehicle user.

4. The vehicle remote control apparatus as claimed in claim 3, further comprising a time identifying unit configured to identify a time at which the vehicle was parked, wherein said check unit is configured to present the time identified by said time identifying unit together with the latest vehicle location to the vehicle user, and to check with the vehicle user whether the latest vehicle location and the time are consistent with what the vehicle user remembers, and wherein said denying unit is configured to deny a remote operation request from the vehicle user if said check unit finds that the vehicle user has determined that the latest vehicle location and the time are not consistent with what the vehicle user remembers.

5. The vehicle remote control apparatus as claimed in claim 3, further comprising a decision unit configured to decide whether it is acceptable to cause the vehicle to perform the operation requested from the vehicle user at the latest vehicle location identified by said location identifying unit, wherein said denying unit is configured to deny a remote operation request from the vehicle user if said decision unit decides that it is not acceptable to cause the vehicle to perform the operation requested from the vehicle user.

6. The vehicle remote control apparatus as claimed in claim 5, wherein said location identifying unit includes:
an acquisition unit configured to acquire data indicative of latitude and longitude of the vehicle and data indicative of a time from the vehicle when the vehicle is parked;
a map information storing unit configured to store data of a road map; and
a road-type identifying unit configured to check the data indicative of latitude and longitude of the vehicle with the data of a road map stored in said map information storing unit so as to identify a road type at the latest vehicle location,
wherein said check unit is configured to check whether it is acceptable to cause the vehicle to perform the operation requested from the vehicle user based on the road type identified by said road-type identifying unit.

7. A vehicle remote control apparatus, for causing a vehicle to perform a requested operation in response to a remote operation request from a vehicle user, comprising:
a location identifying unit configured to identify a latest vehicle location where the vehicle is parked;
a determination unit configured to determine a degree of danger resulting from causing the vehicle to perform an operation requested from the vehicle user at the latest vehicle location identified by said location identifying unit; and
a denying unit configured to deny a remote operation request from the vehicle user in response to the degree of danger determined by said determination unit,
wherein said determination unit is configured to classify the degree of danger into a first rank, a second rank, and a third rank in a descending order of the degree of danger, and wherein said denying unit is configured to deny a remote operation request from the vehicle user if said determination unit determines the degree of danger to be the first rank, and is further configured to present, if said determination unit determines the degree of danger to be the second rank, the latest vehicle location identified by said location identifying unit to the vehicle user, to check with the vehicle user whether it is acceptable to cause the vehicle to perform an operation requested from the vehicle user at the latest vehicle location, and to deny a remote operation request from the vehicle user only when the vehicle user determines that it is not acceptable to cause the vehicle to perform the requested operation.

8. A method of remotely controlling a vehicle, comprising the steps of:
identifying a latest vehicle location where the vehicle is parked;
deciding whether the identified latest vehicle location is proper for a specified operation to be performed;
informing a vehicle user via a communication terminal owned by the vehicle user of the identified latest vehicle location, wherein said step of deciding checks with the vehicle user whether the identified latest vehicle location is proper for the specified operation to be performed;
receiving information entered by the vehicle user into the communication terminal about whether it is acceptable to cause the vehicle to perform the operation to be performed; and
causing the vehicle to perform the specified operation by remote control in response to a decision that the identified latest vehicle location is proper for the specified operation to be performed.

9. The method as claimed in claim 8, further comprising a step of:
denying a request to perform the specified operation in response to a decision that the identified latest vehicle location is not proper for the specified operation to be performed.

10. The method as claimed in claim 8, further comprising a step of identifying a road type at the identified latest vehicle position by checking the identified latest vehicle position with data of a road map, wherein said step of deciding refers to the identified road type to decide whether the identified latest vehicle location is proper for the specified operation to be performed.

11. The method as claimed in claim 8, further comprising a step of identifying a time at which the vehicle was parked at the latest vehicle location, wherein said step of informing a vehicle user informs the vehicle user of the identified time in addition to the identified latest vehicle location.

12. The method as claimed in claim 8, wherein said step of deciding includes the steps of:
assigning the identified latest vehicle location to one of a plurality of levels, which are associated with respective procedures that are to be performed to decide whether the identified latest vehicle location is proper for the specified operation to be performed; and
performing one of the procedures associated with said one of the plurality of levels to which the identified latest vehicle location is assigned.

13. The method as claimed in claim 12, wherein a first one of the procedures requires that the specified operation be not performed without exception, and a second one of the procedure requires that the specified operation be not performed if a vehicle user denies propriety of the specified operation being performed at the identified latest vehicle location.

* * * * *